United States Patent [19]
Komori et al.

[11] Patent Number: 5,928,328
[45] Date of Patent: Jul. 27, 1999

[54] COMPUTER NETWORK MANAGEMENT INFORMATION SYSTEM

[75] Inventors: Naoki Komori, Nerima-ku; Akio Morita, Iruma-gun; Katsuaki Suzuki, Asaka, all of Japan

[73] Assignee: Honda Giken Kogyo Kabushikikaisha, Tokyo, Japan

[21] Appl. No.: 08/191,857

[22] Filed: Feb. 3, 1994

[30] Foreign Application Priority Data

Feb. 8, 1993 [JP] Japan ................................. 5-020379

[51] Int. Cl.⁶ ........................ G06F 3/14; G06F 15/16; G06F 11/34
[52] U.S. Cl. ........................ 709/223; 709/224; 714/4; 714/37
[58] Field of Search ........................ 395/800, 156, 395/500, 161, 600, 200, 325, 575, 700, 154, 155, 163, 148, 118, 200.35, 200.56, 200.53, 670, 674, 856, 182.13, 110, 115, 200.62, 183.13; 364/DIG. 1, DIG. 2, 188, 132, 49.16, 138; 709/226, 223; 714/4, 37

[56] References Cited

U.S. PATENT DOCUMENTS

| | | | |
|---|---|---|---|
| 4,559,614 | 12/1985 | Peek et al. | 395/500 |
| 4,754,428 | 6/1988 | Schultz et al. | 395/275 |
| 4,908,759 | 3/1990 | Alexander, Jr. et al. | 395/600 |
| 5,055,996 | 10/1991 | Keslowitz | 364/188 |
| 5,119,465 | 6/1992 | Jack et al. | 395/500 |
| 5,278,978 | 1/1994 | Demers et al. | 395/600 |
| 5,339,428 | 8/1994 | Burmeister et al. | 395/700 |

FOREIGN PATENT DOCUMENTS 1116842  5/1989  Japan.

*Primary Examiner*—Daniel H. Pan
*Attorney, Agent, or Firm*—Fish & Richardson P.C.

[57] ABSTRACT

A computer system comprises a system management subsystem and one or more operational subsystems, which are connected in a network, and the operational computer subsystem comprises notifying means for notifying management information relating to all resources under the management of a host computer to the system management subsystem, and verifying means for verifying the resources under the management in accordance with an instruction of the system management subsystem, notifying the results to the system management subsystem, and the system management subsystem comprises state display means for displaying a total system state in a standardized format common to the whole system, and instructing means for instructing the verifying means to verify.

12 Claims, 17 Drawing Sheets

Fig. 17

| State code | Name of system resources | Comment |
|---|---|---|
| HW01 | Application | Application JUTYU is ACTIVE |

⎫ Data in a management information
⎭ format peculiar to the subsystem 1

Fig. 18

| Header | | | | | | |
|---|---|---|---|---|---|---|
| Identifying character | Kind of monitoring region | Name of computer system | Name of system resources | Monitoring state | Date | Comment |
| NR | Application | Subsystem1 | JUTYU | Starting | 920123 | ACTIVE |

⎫ Data in a standarized management
⎭ information format

COMPUTER NETWORK MANAGEMENT INFORMATION SYSTEM

BACKGROUND OF THE INVENTION

1. Field of the Invention

The present invention relates to a computer network system in which a plurality of computers is connected, and specifically relates to a computer system which is effective for a case that a plurality of vendors' products is used as units which are connected to a computer network.

2. Related Background Art

With the high advancement of information processing by a computer, construction of a total computer system in which computer subsystems are distributed regionally and spatially and connected into a network has been developing. To manage a distributed processing system with the network connection, it is preferred that a management/maintenance center be established in order to save human resources and to reduce the time from the occurrence of a fault to the restoration of the fault. In this center, detection of a fault analysis of a fault state, and an instruction to restore are executed as the centralized management process.

As such a management process, the following two stages are considered.

(1) Management of network resources which connect each subsystem.

(2) Management of resources which each subsystem uses on operations, including hardware resources and software resources except network resources.

Regarding to the "centralized management of network resources" of the aforesaid (1), each computer vendor releases products corresponding with an individual network architecture, to achieve the following functions (a) Network configuration control (b) Network fault control (c) Network performance control (d) Network secrecy control These various controls can be achieved based on the fact that protocol on the network is mounted in each subsystem in accordance with the industry standards or the international standards.

However, the present state of centralized "management of the operational resources" of (2) is groping for its achievement. This is because each computer which manages subsystems individually is provided by a different vendor. Each vendor therefore has to be taken into consideration by the centralized management process. The architecture which each computer vendor employs is constructed according to each company's strategies so that it shows the greatest effects in a target market that may be paticular to each vendor.

The hardware and a basic software which each vendor provides are designed/manufactured and released to the market. Accordingly, a management method for the operational resources, executed by the computer that controls each subsystem may differ for ordinary cases of system construction.

On the other hand, the operational resources which each subsystem uses are managed by a host computer installed in the subsystem, and the management information exists in the host computer and is displayed on a console unit of the host computer. It is possible that the displayed information is notified to a management/maintenance center which is far from each subsystem by using, for example, "Method of Automatic Fault Notifying" disclosed in Japanese Patent Laid-Open No. 1-116842 (116842/1989), and is displayed on a display unit installed in the management/maintenance center. In a case of employing this method, the management information of each subsystem displayed in the management/maintenance center has a format peculiar to a subsystem which is a transmitting source, and a management/maintenance person processes the management information by an information analysis method which differs for each subsystem.

SUMMARY OF THE INVENTION

It is an object of the present invention to provide a computer system including a plurality of multi vendors' computer subsystems.

A first computer system of the present invention comprises a system management computer subsystem (hereinafter called system management subsystem), and one or more operational computer subsystems (hereinafter called operational subsystem) which are connected in a network, and (a) the operational computer subsystem comprises notifying means for notifying management information which is used while the operation is executing, relating to all resources under the management of a host computer of said operational computer subsystem, and (b) the system management computer subsystem comprises state display means for displaying a total system state based on the management information notified from the operational computer subsystem through the notifying means.

A second computer system of the present invention comprises a system management computer subsystem and one or more operational computer subsystems which are connected into a network, and (a) the operational computer subsystem comprises notifying means for notifying management information which is used while operation is executing, relating to all resources under the management of a host computer of the operational computer subsystem, and verifying means for verifying the resources which are used while the operation is executing in accordance with the instruction of the system management computer subsystem, notifying the results to the system management computer subsystem, and (b) the system management computer subsystem comprises state display means for displaying the system state based on the management information notified from the operational computer subsystem through the notifying means, and instructing means for instructing the verifying means to verify.

In both computer systems, the notifying means preferably comprises (1) management information detecting means for detecting the generation of the management information, (2) format converting means for converting the management information having a management information format peculiar to each operational computer subsystem, detected by the management information detecting means into the management information having a standardized management information format common to the whole system, and (3) management information transmitting means for transmitting the subsystem management information converted into the standardized management information format by the format converting means to the system management computer subsystem, and the state display means preferably comprises (1) receiving means for receiving the management information having the standardized management information format, transmitted from the operational computer subsystem, (2) data generating means for generating state display data based on the management information having the standardized management information format loaded through the receiving means, and (3) display means for displaying the state display data. Here, the format converting means may comprise a reference table for the format conversion registered by every operational computer subsystem, and a program stored in the operational computer subsystem which executes the data format conversion, referring to the reference table for the format conversion.

In both computer systems, the receiving means may comprise one receiving unit, and the management information having the standardized management information format transmitted from the operational computer subsystem may be through the receiving unit.

Further, in the second computer system of the present invention, the instructing means preferably comprises either (1) generating means for periodically generating a verification instruction request in the system management computer subsystem, (2) verification instruction data generating means for generating verification instruction data to be notified to the operational computer subsystem in accordance with the verification contents instructed by the generating means, and (3) verification instruction transmitting means for transmitting the verification instruction data to the specified operational computer subsystem, or (1) verification instruction detecting means for detecting the verification instruction from outside, (2) verification instruction data generating means for generating the verification instruction data to be notified to the operational computer subsystem in accordance with the requested instruction contents detected by the verification instruction detecting means, and (3) verification instruction transmitting means for transmitting the verification instruction data to the specified operational computer subsystem.

Further, in the second computer system of the present invention, the instructing means preferably comprises (1) receiving means for receiving the verification instruction data transmitted from the system management computer subsystem, (2) verification executing means for analyzing the verification instruction data, executing a simulative operation for the instructed verification, whereby the results are obtained, and (3) verification results transmitting means for transmitting the verification results obtained by the verification executing means to the system management computer subsystem.

According to the first computer system of the present invention, the detected management information relating to the resources under the management of the host computer of each operational subsystem is notified to the system management subsystem through the network. The management information is displayed in the format which matches among the operational subsystems and eases decoding/analyzing for a management/maintenance person after the total processing is performed thereto by the host computer of the system management subsystem. In the computer system, if the method, in which the management information detected by each operational computer subsystem is converted into the management information format common to the whole system (the standardized management information format) and then notified to the system management subsystem, is applied, the process of mounting the system management subsystem to the host computer can be standardized, and the expansion of the operational subsystem can be easy.

According to the second computer system of the present invention, in addition to the above operations of the first computer system of the present invention, the following operations are performed. The instruction to verify the state of the resources of the operational subsystem is issued from the system management subsystem. The operational subsystem which receives this instruction executes a simulative operation against the resources which are objects of the verification while executing the original operations, and responds to the system management subsystem with the execution results. The response, which is the management information of the operational system and the management information obtained by the operations of the first computer system of the present invention are is totally processed and displayed.

Thus, according the computer systems of the present invention, the management information generated in the operational computer subsystem is notified to the system management computer subsystem established in the management/maintenance center, and is displayed on the display unit in the format which the total system state can easily be grasped, so that the operating state of the system resources and the state of a fault can easily be grasp, and the effective management of the computer system can be possible even though the host computer of the subsystem is provided by different vendors.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 17 and FIG. 18 are a view for explaining the format conversion of management information of the embodiment.

DETAILED DESCRIPTION OF THE PREFERRED EMBODIMENTS

The embodiments of the present invention will be explained hereinbelow with reference to the accompanying drawings.

Figure 1:
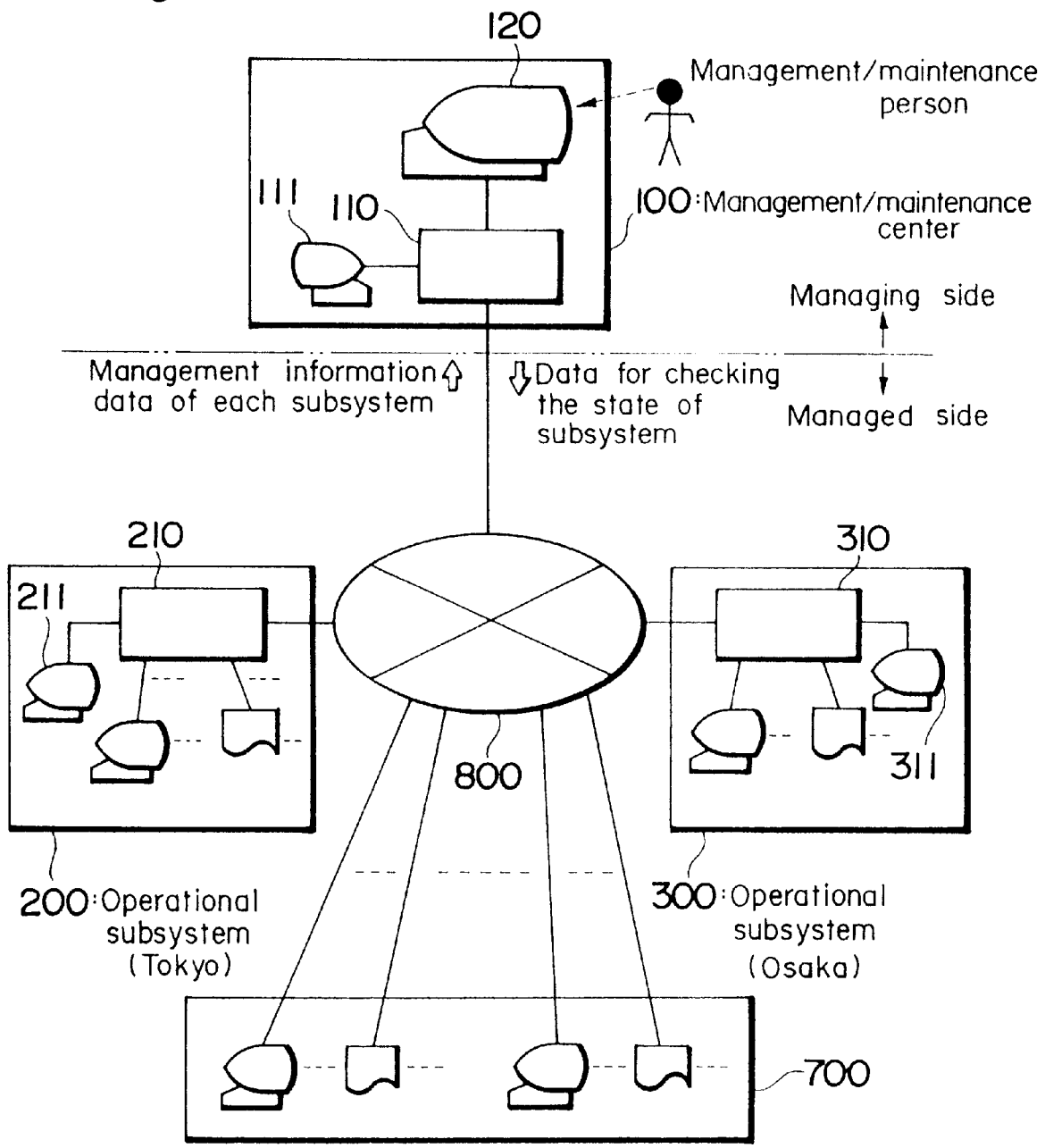
FIG. 1 is a schematic view showing a physical connection of a computer system which employs a computer system of the embodiment.

FIG. 1 shows a configuration of a physical connection between subsystems in a system which employs a computer system according to the embodiment. In the system, a network (including a time-division multiplexer (TDM) and/or a private branch exchange (PBX)) 800 is a medium for connecting, and a system management computer subsystem 100 which is placed in a management/maintenance center, an operational computer subsystem 200 and an operational computer subsystem 300, which are placed at a location where the operation takes place, and a group of terminal units 700 are connected to the network 800.

The system management computer subsystem 100 comprises a host computer 110, a main console unit 111 for inputting an instruction to the host computer 110 to display unique management information and to perform basic operations of the host computer 110, and a display unit 120 for displaying a system state in accordance with the instruction of the host computer 110.

The operational computer subsystem 200 is established, e.g., in Tokyo. This subsystem comprises a host computer 210, a main console unit 211 for inputting an instruction to the host computer 210 to display unique management information and to perform basic operations of the host computer 210, and terminal units for operational use such as an input/output unit (e.g., a keyboard, or a CRT display) or an output unit (e.g., a printer unit).

The operational computer subsystem 300 is established, e.g., in Osaka. Similar to the operational computer subsystem 200, this subsystem comprises a host computer 310, a main console unit 311 for inputting an instruction to the host computer 310 to display unique management information and to perform basic operations of the host computer 310, and terminal units for operational use such as an input/output unit (e.g., a keyboard, or CRT display) or an output unit (e.g., a printer unit).

Figure 2:
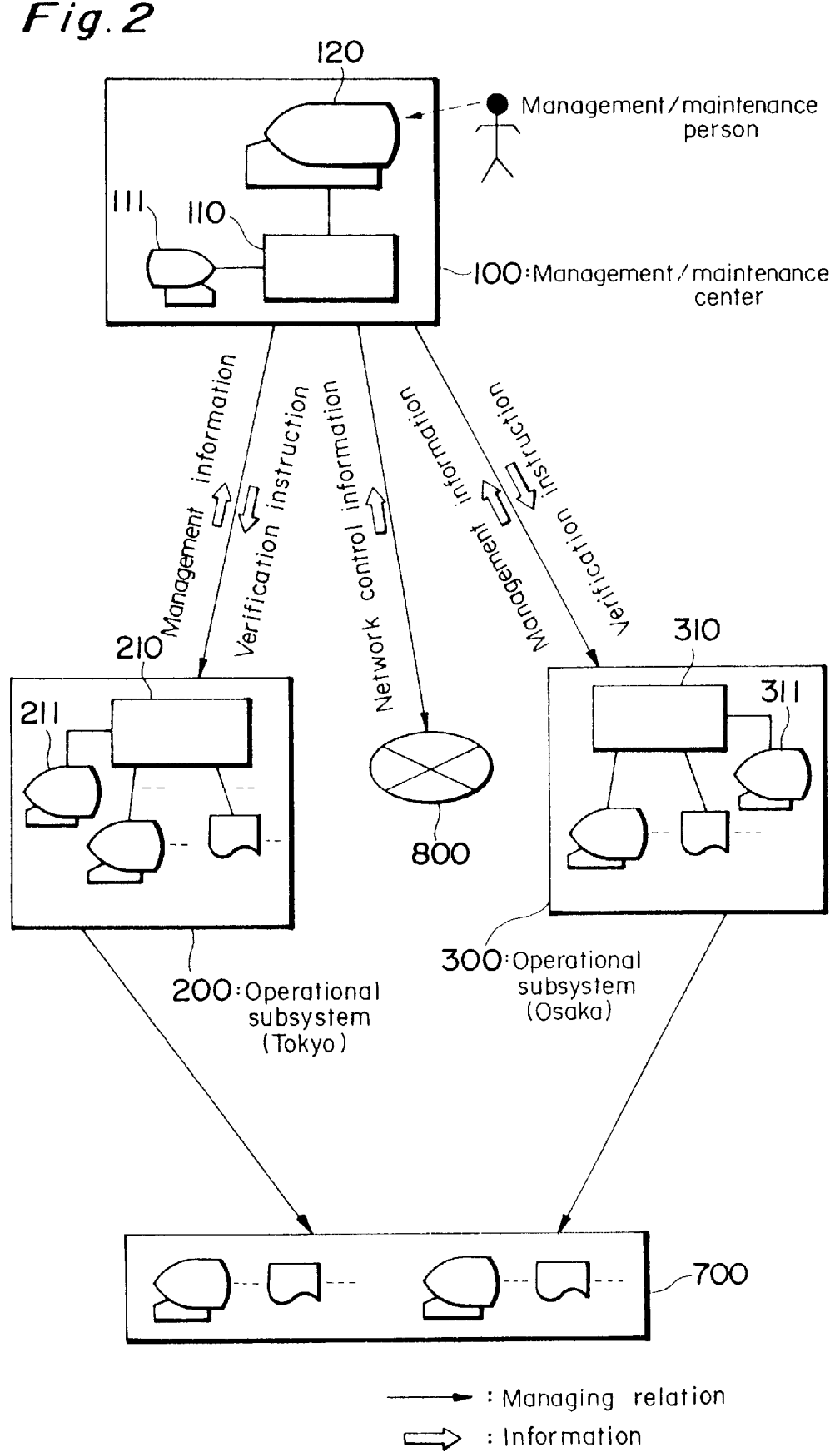
FIG. 2 is a view showing a logical configuration relating to management of a computer system which employs a computer system of the embodiment.

FIG. 2 shows a configuration of a logical connection between the managing side and the managed side in a system which is constructed by using a computer system of the present invention. The system management computer subsystem 100 directly manages components of the network 800 (including TDM and PBX), operational computer subsystems 200 and 300, and indirectly manages the terminal units 700, which are connected to the network 800, through the operational computer subsystems. Here, one of well-known methods is applied for managing the network 800.

Figure 3:
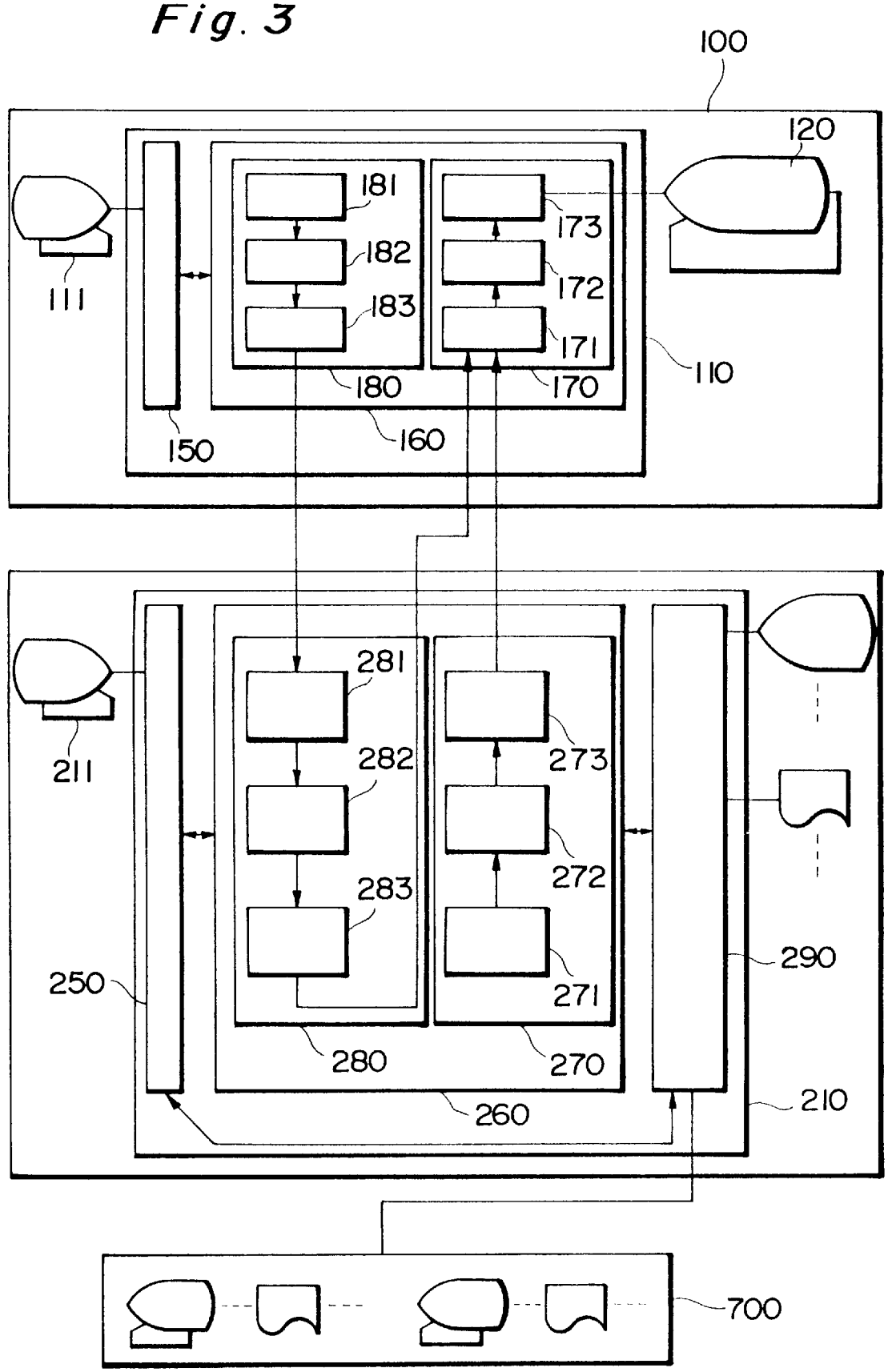
FIG. 3 is a view showing a logical and detailed configuration of a system management subsystem and an operational subsystem of the embodiment.

FIG. 3 shows a configuration of a logical connection between the system management subsystem 100 and the operational computer subsystem 200 which is one of the objects to be controlled. The logical connection between the system management subsystem 100 and the operational computer subsystem 300 is also achieved in the similar way.

Hardware of the system management computer subsystem 100 and application programs are managed by an operating system (OS) 150 which is basic software of the subsystem. A system management program 160 which is one of the application programs under the management of the OS 150 provides information in a format which is common to all operational subsystems to a system management/maintenance person for managing the whole system.

Figure 4:
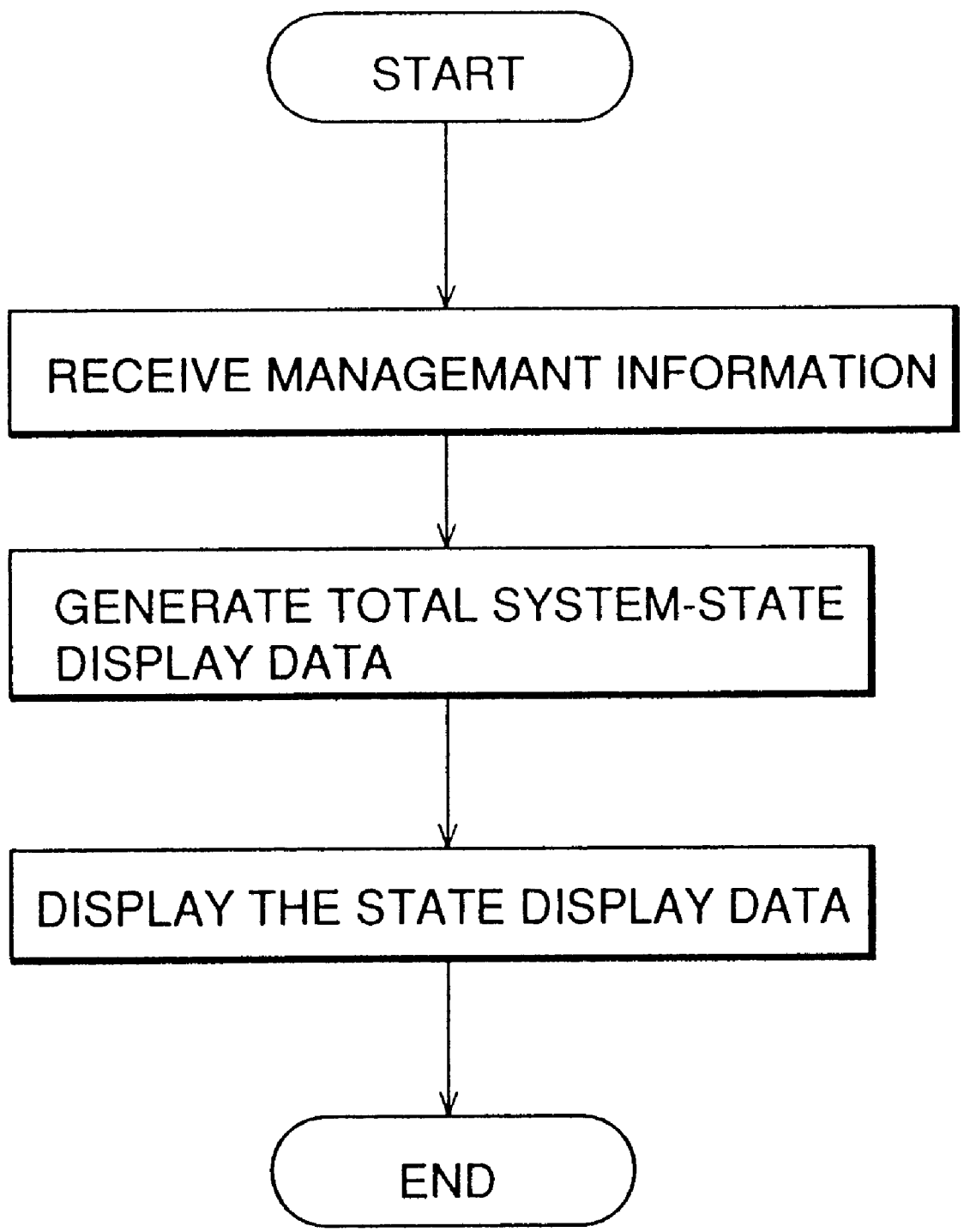
FIG. 4 is a flowchart of a passive system management program.
Figure 5:
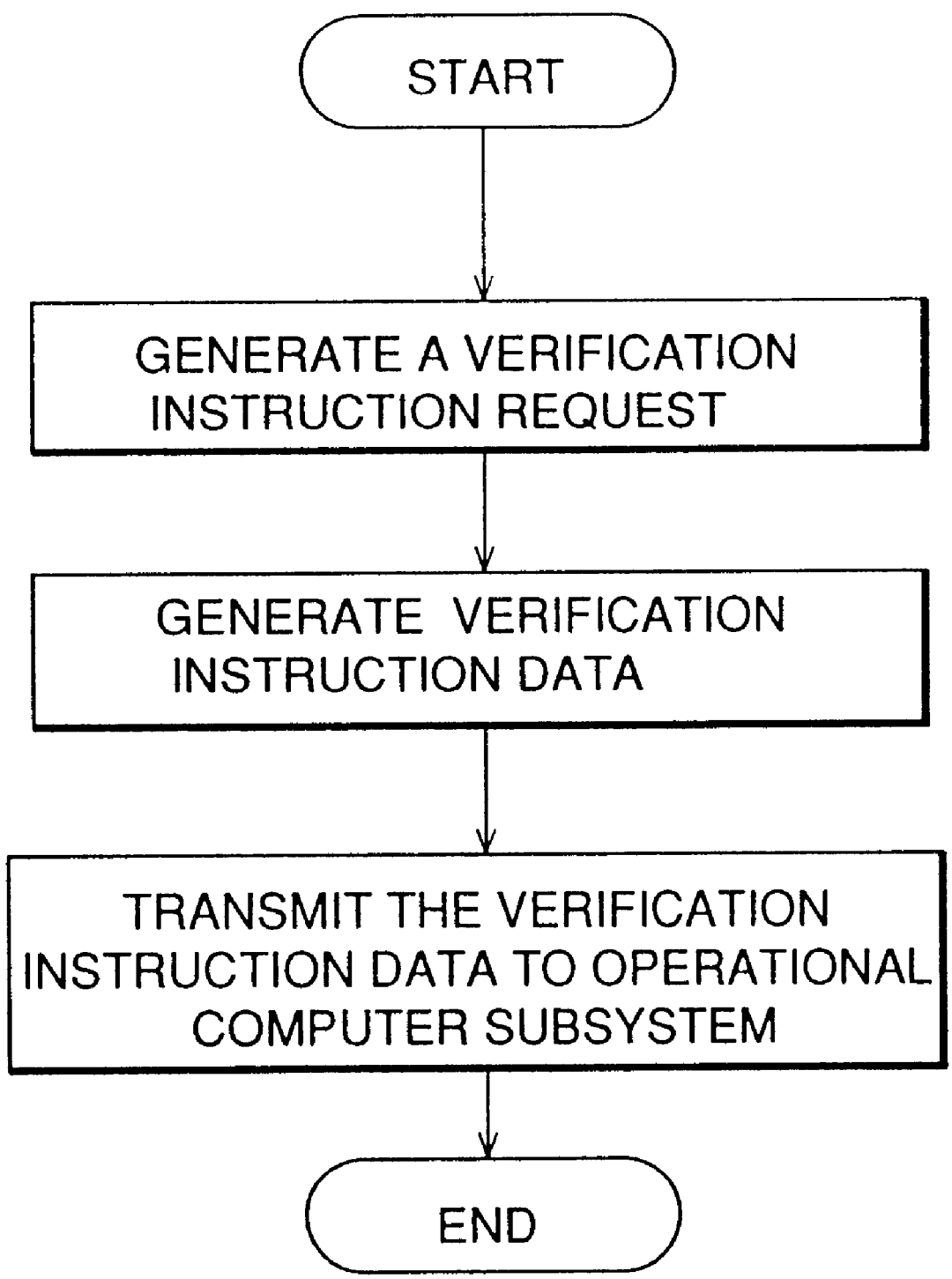
FIG. 5 is a flowchart of an active system management program.
Figure 6:
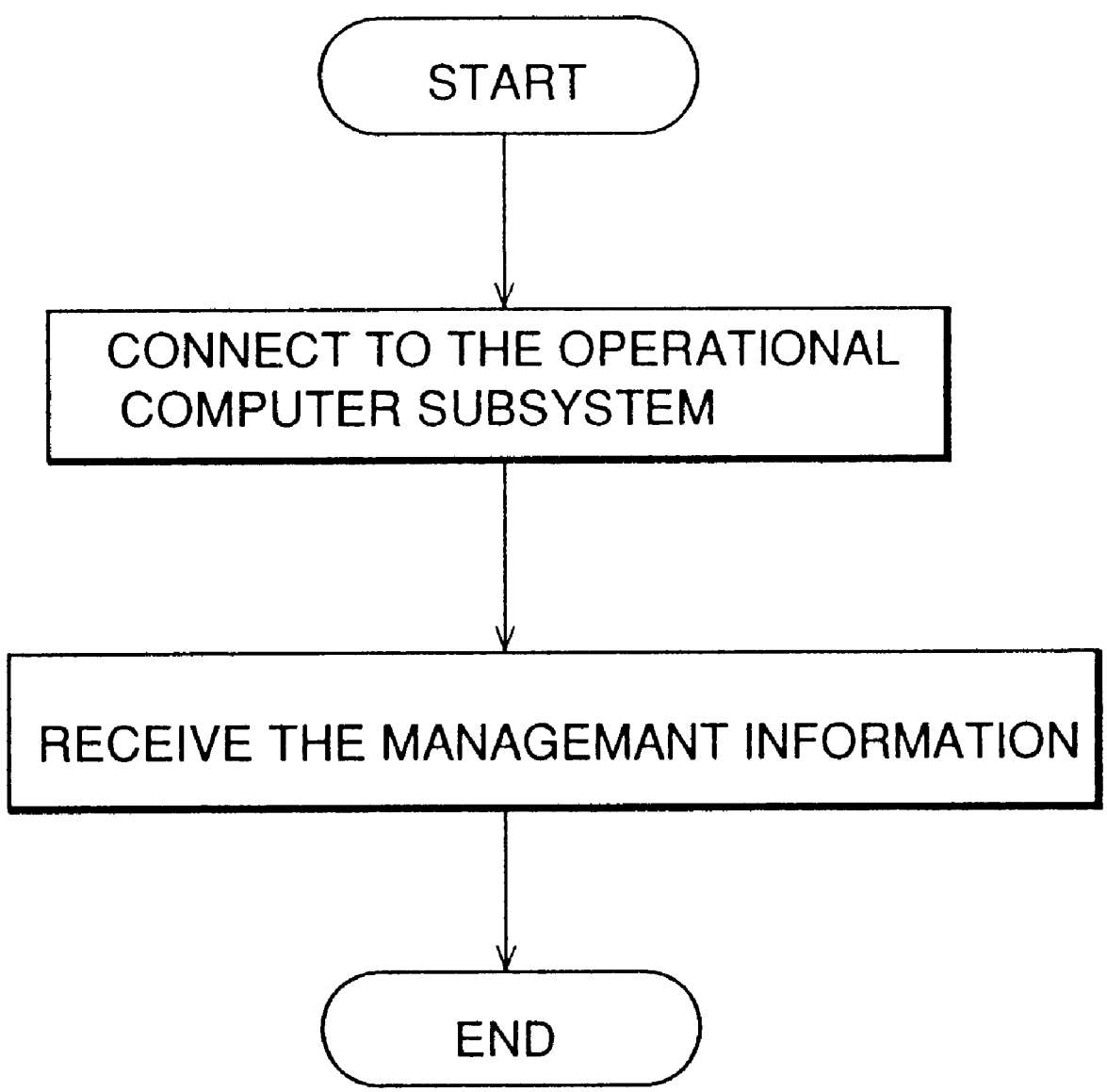
FIG. 6 is a flowchart of a receiving program.
Figure 7:
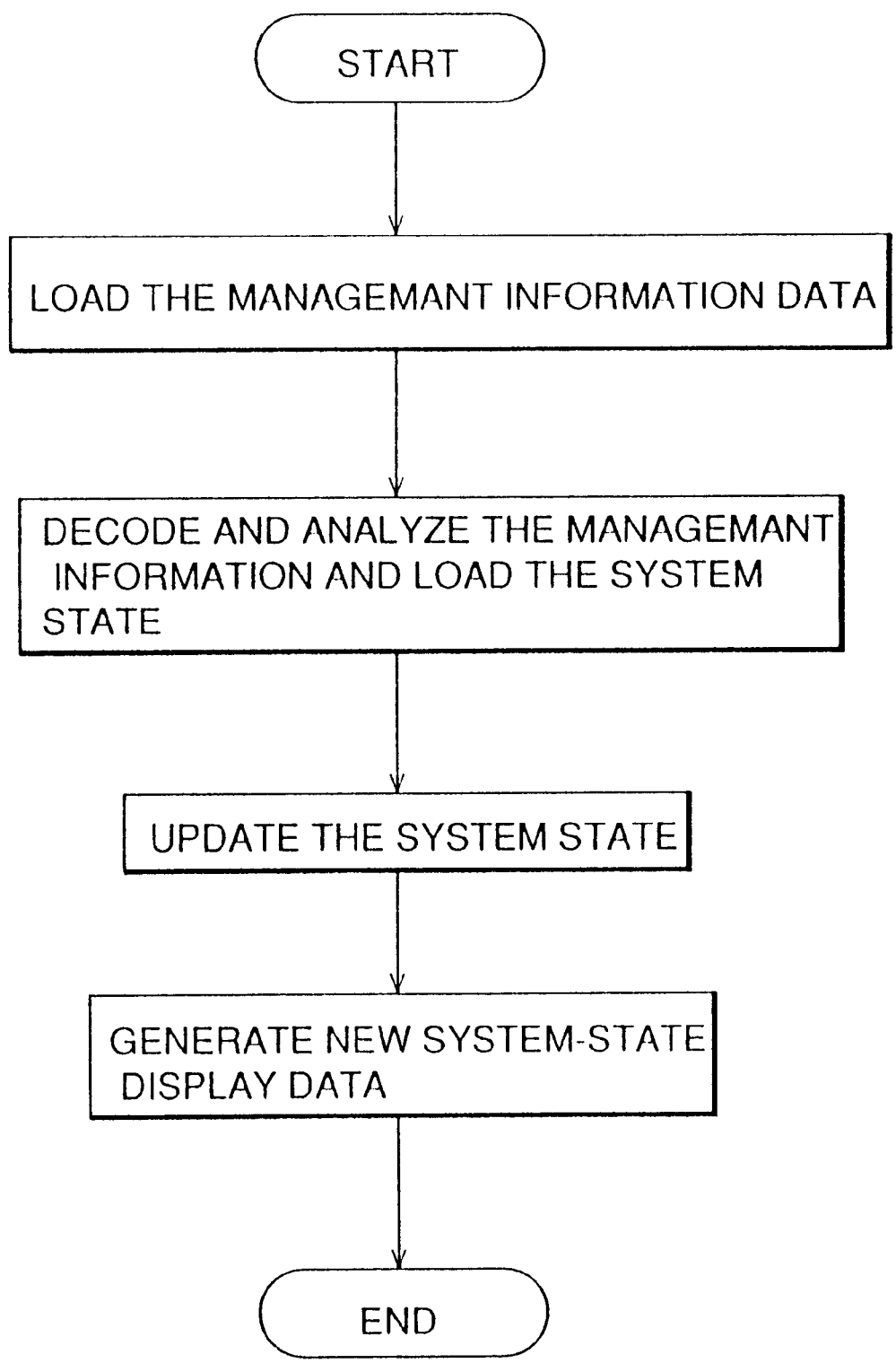
FIG. 7 is a flowchart of a state display data generating program.
Figure 8:
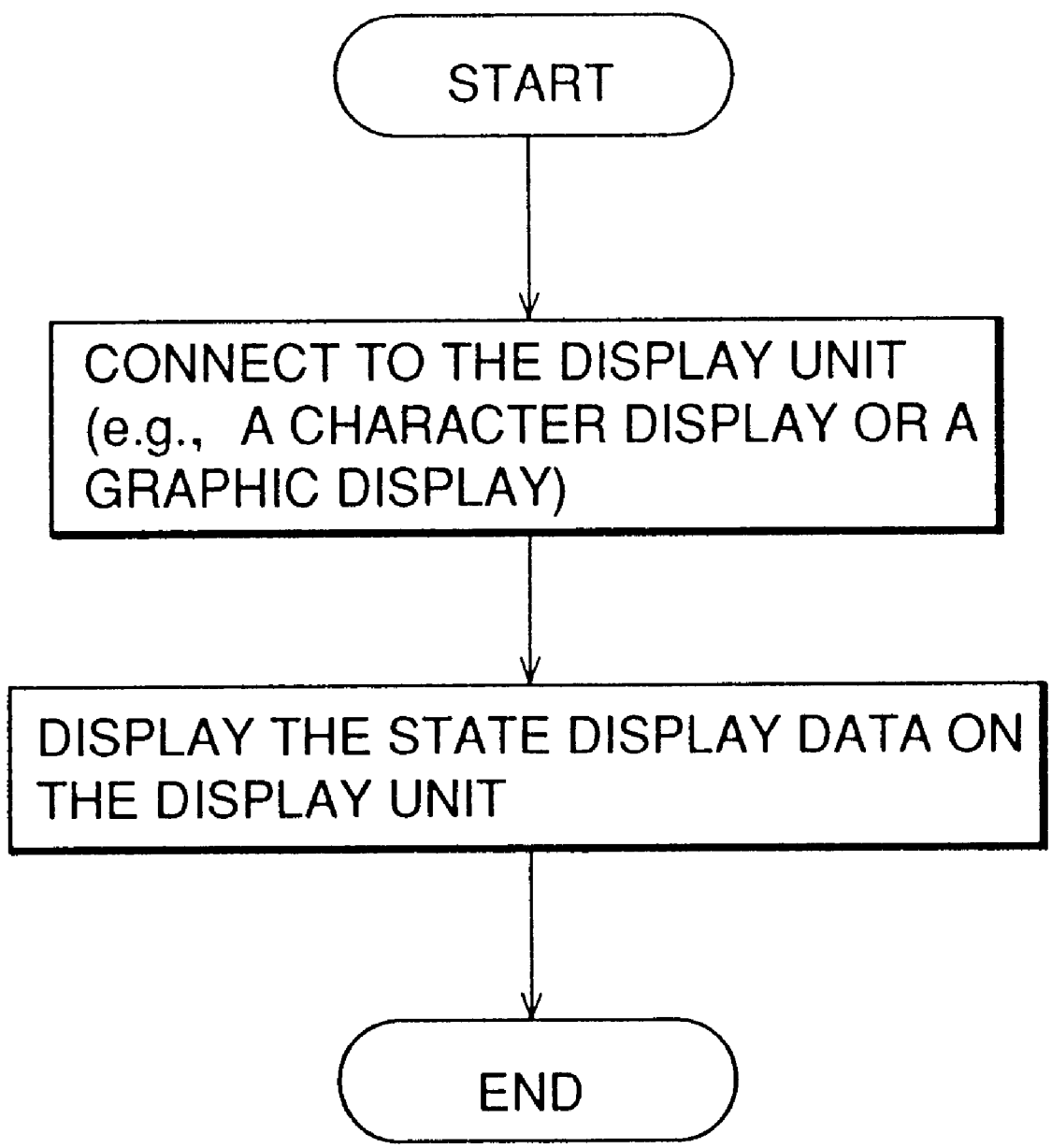
FIG. 8 is a flowchart of a state display program.
Figure 9:
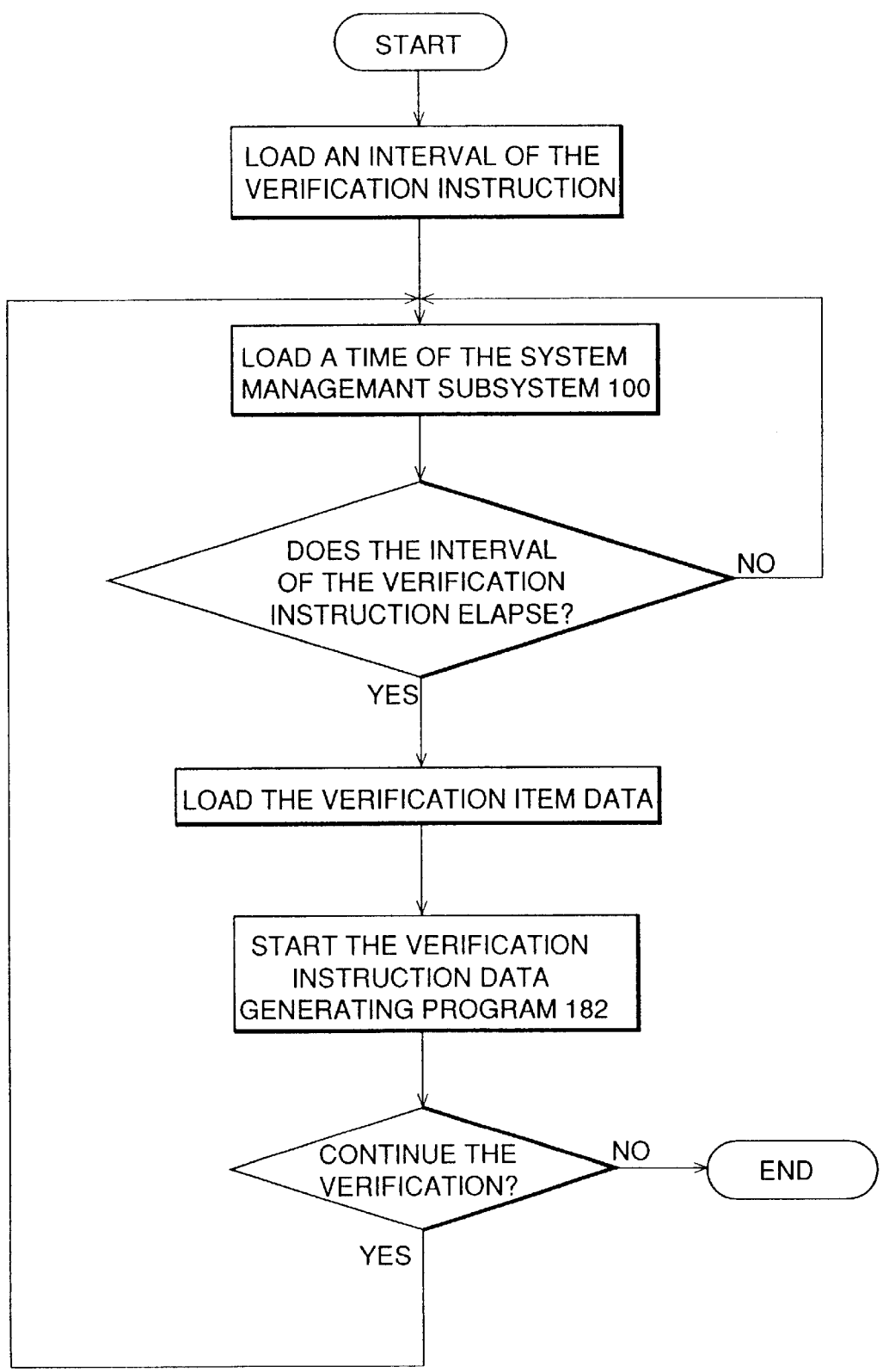
FIG. 9 is a flowchart of a verification request detecting program.
Figure 10:
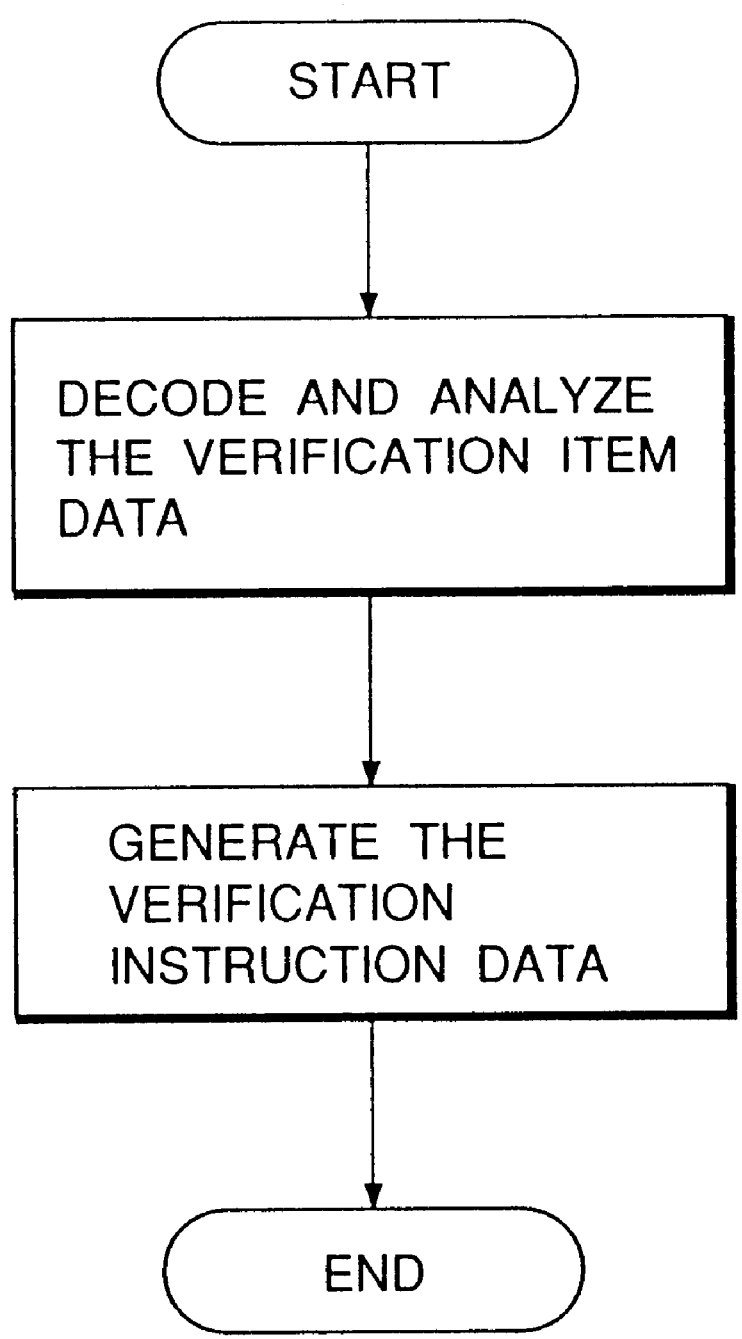
FIG. 10 is a flowchart of a verification instruction data generating program.
Figure 11:
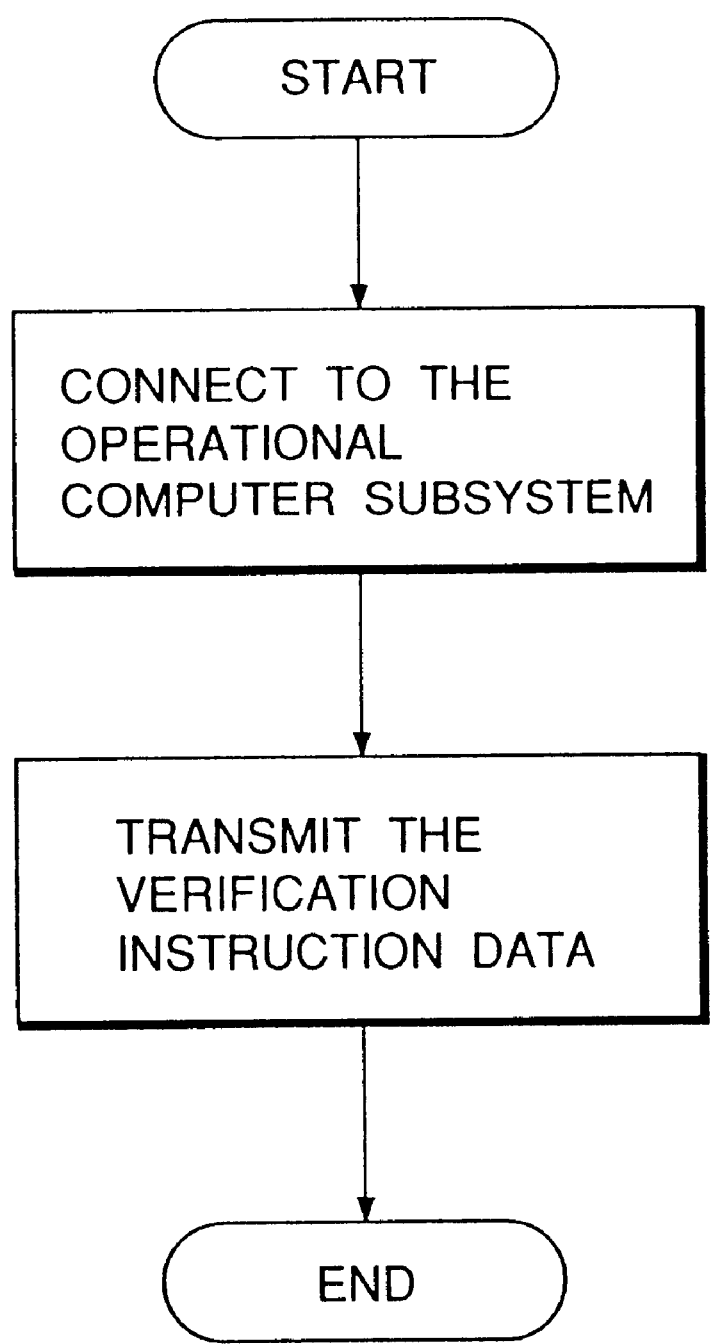
FIG. 11 is a flowchart of a verification instruction transmitting program.

The system management program 160 comprises a passive system management program 170 (its flowchart is shown in FIG. 4) and an active system management program 180 (its flowchart is shown in FIG. 5). The passive system management program 170 comprises a receiving program 171 (its flowchart is shown in FIG. 6) for receiving management information data which is transmitted from the operational subsystem 200, a state display data generating program 172 (its flowchart is shown in FIG. 7) for decoding/analyzing the management information data received by the receiving program 171, processing the management information with other management information from other operational subsystems, whereby data for the state display is generated, and a state display program 173 (its flowchart is shown in FIG. 8) for displaying the generated state display data on the display unit. The active system management program 180 comprises a verification request detecting program 181 (its flowchart is shown in FIG. 9) for detecting a verification request, a verification instruction data generating program 182 (its flowchart is shown in FIG. 10) for generating verification instruction data which notifies the verification request to the operational subsystem 200, and a verification instruction transmitting program 183 (its flowchart is shown in FIG. 11) for transmitting the verification instruction data to the operational subsystem 200.

Hardware of the operational computer subsystem 200, application programs, and terminal units which are connected into a network and are used when the operation executes are managed by an operating system (OS) 250 which is basic software of the subsystem. A management information notifying program 260 which is one of the application programs provides the management information generated as a result of managing resources by the OS 250 to the system management computer subsystem 100 which assumes a management of resources of the operational computer subsystem 200, using functions of the hardware and the basic software.

Figure 12:
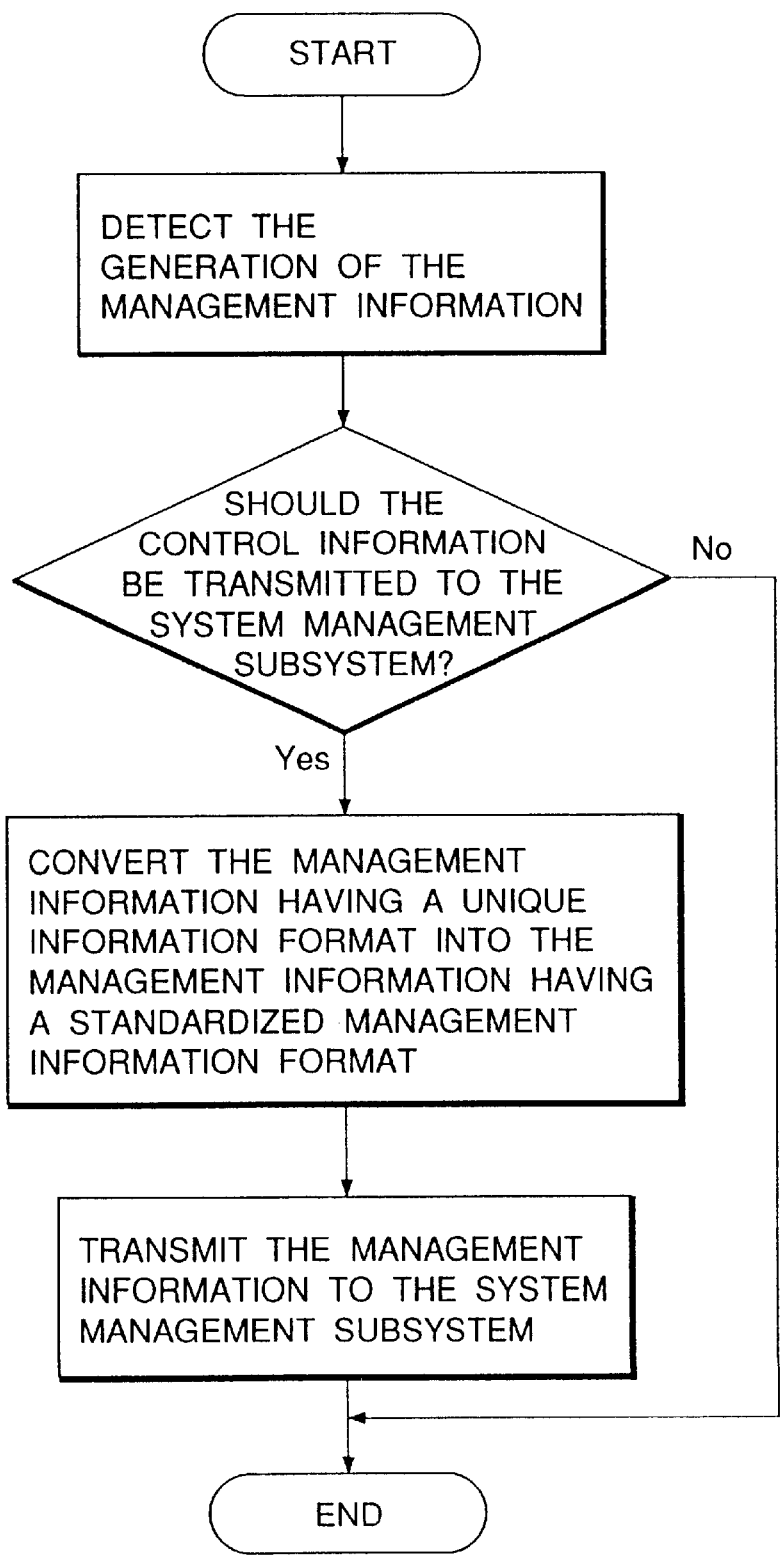
FIG. 12 is a flowchart of a passive management information notifying program.
Figure 13:
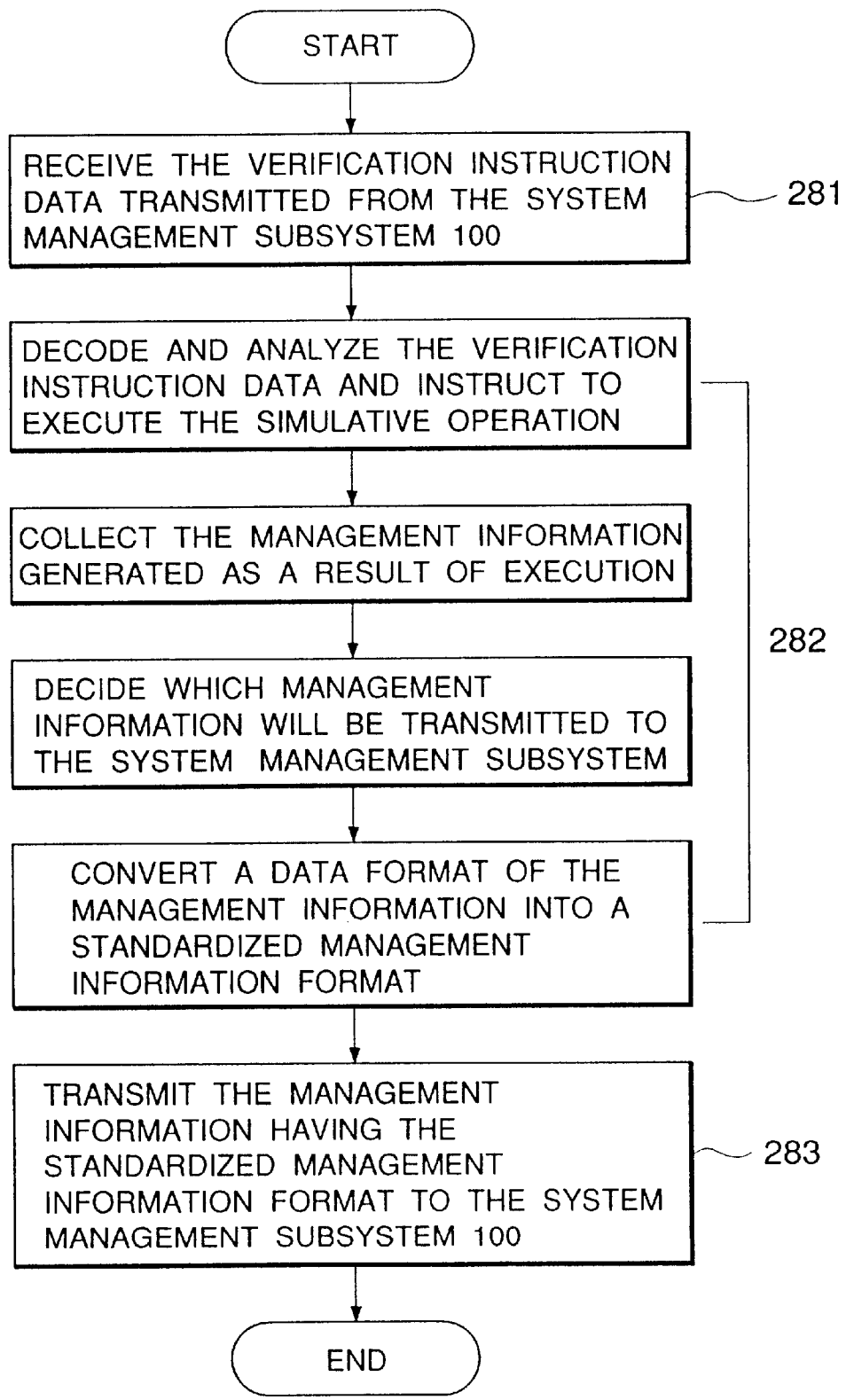
FIG. 13 is a flowchart of an active management information notifying program.
Figure 14:
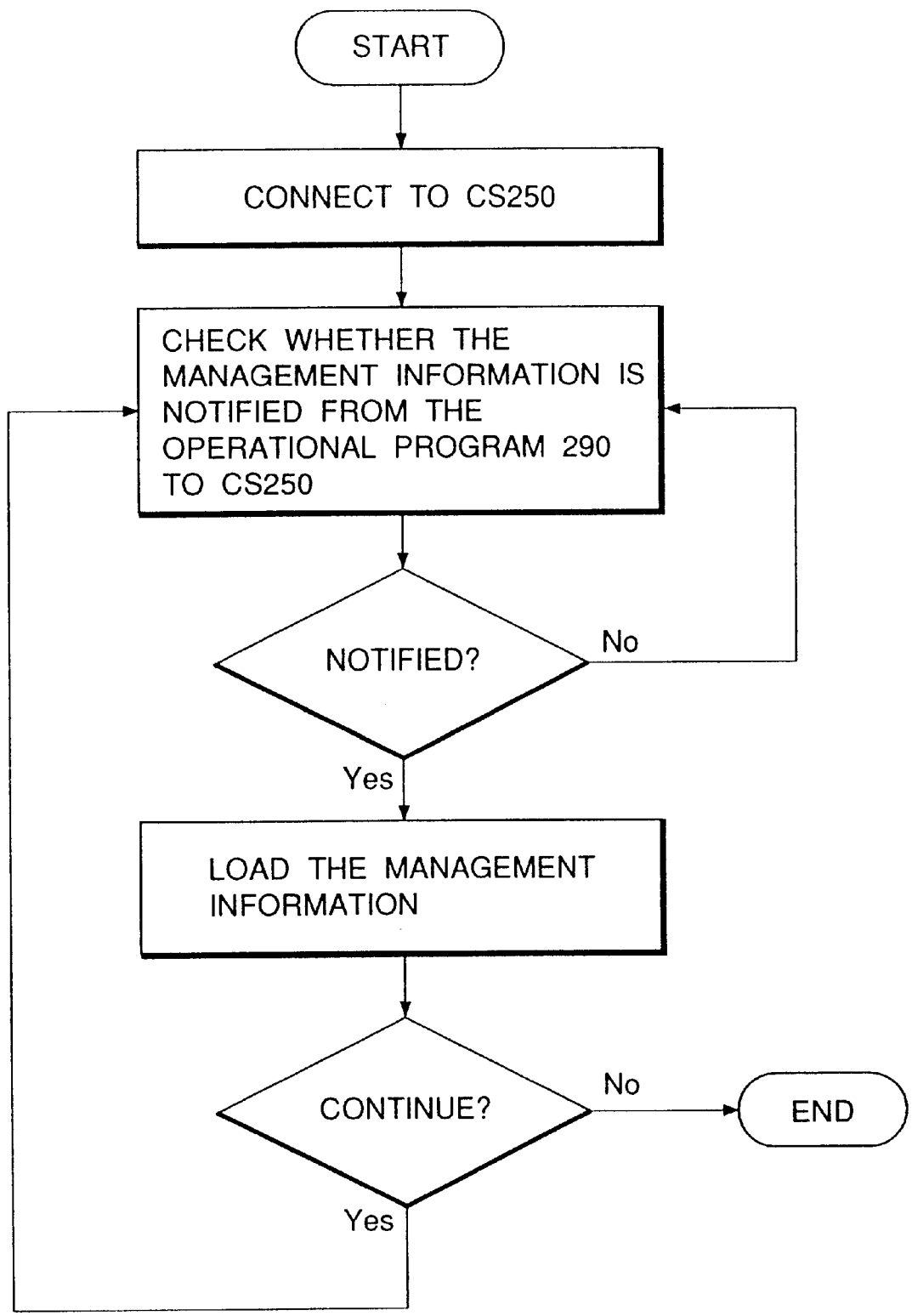
FIG. 14 is a flowchart of a detecting program.
Figure 15:
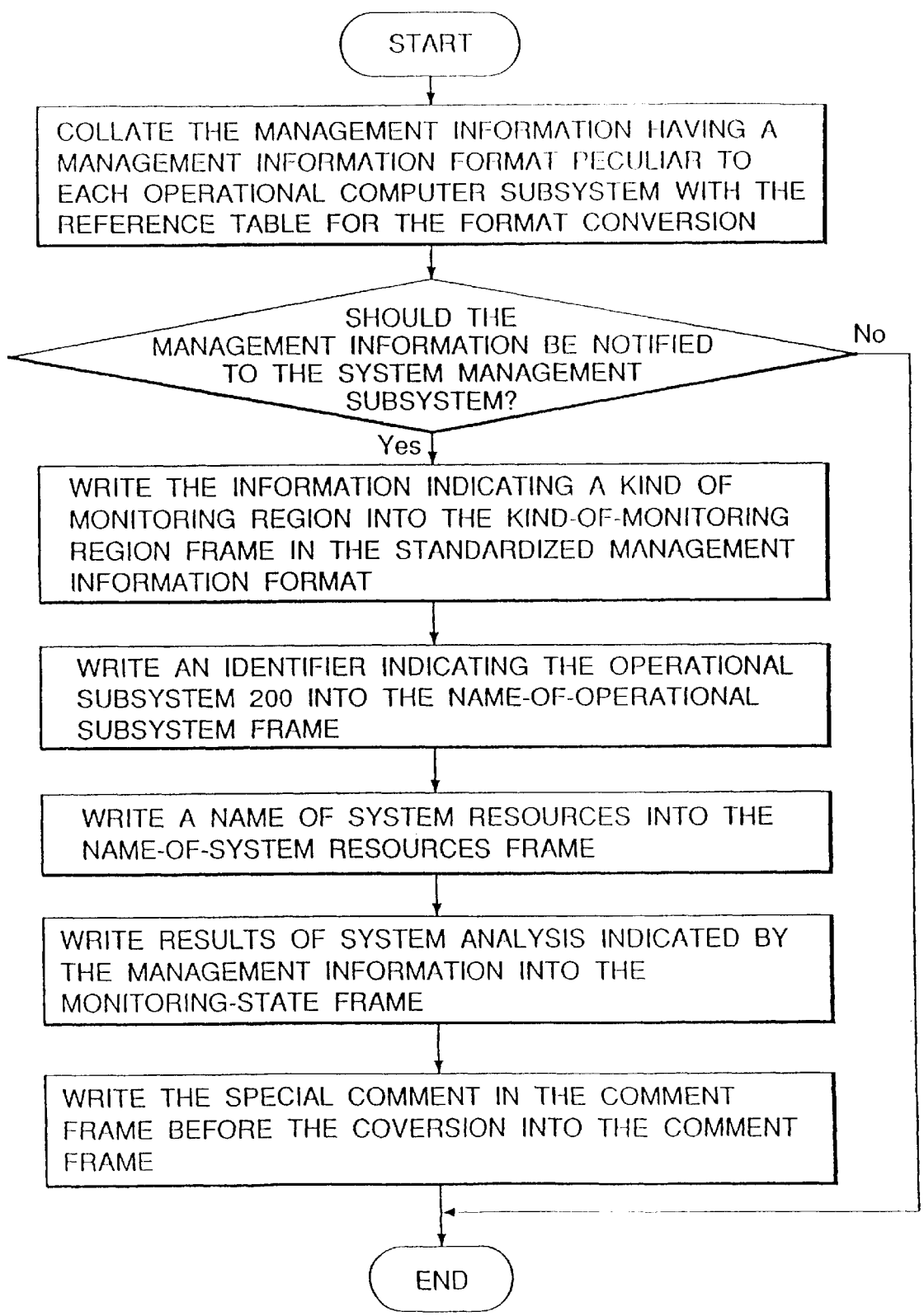
FIG. 15 is a flowchart of a format converting program.
Figure 16:
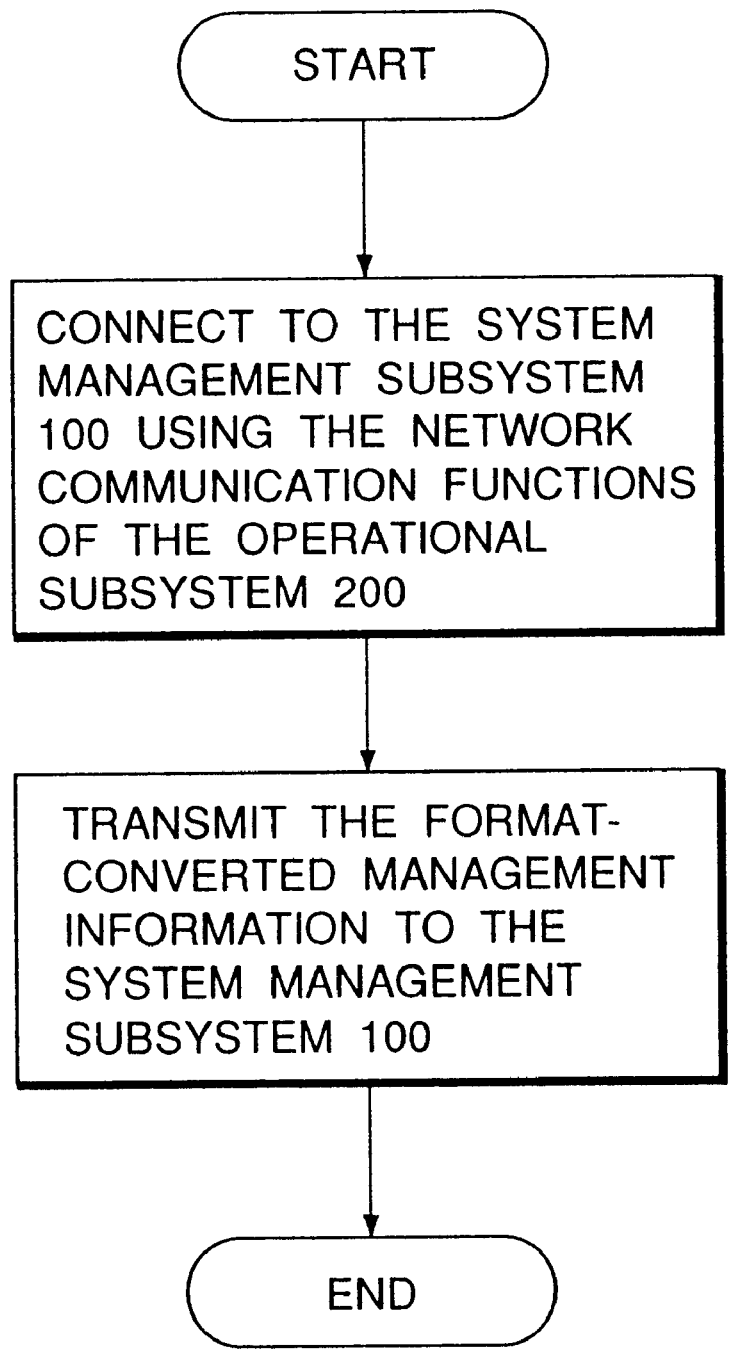
FIG. 16 is a flowchart of a management information transmitting program.

The management information notifying program 260 comprises a passive management information notifying program 270 (its flowchart is shown in FIG. 12) and an active management information notifying program 280 (its flowchart is shown in FIG. 13). The passive management information notifying program 270 comprises a detecting program 271 (its flowchart is shown in FIG. 14) for detecting management information generated through the ordinary operations, a format converting program 272 (its flowchart is shown in FIG. 15) for deciding what management information is to be notified to the system management subsystem by selecting from the detected management information, thereafter converting a management information data format into a standardized management information format which is common to the whole system, and a management information transmitting program 273 (its flowchart is shown in FIG. 16) for transmitting the management information having a standardized management information format to the system management subsystem 100. The active management information notifying program 280 comprises a receiving program 281 for receiving verification instruction data to be transmitted from the system management subsystem 100, a verification program 282 for decoding/analyzing the verification instruction data received by the receiving program 281, instructing to operate the simulative operation, collecting management information generated as a result of executing the simulative operation, deciding the management information to be notified to the system management subsystem by selecting from the detected management information, converting the management information data format into the standardized management information format which is common to the whole system, and a management information transmitting program 283 for transmitting the management information having the standardized management information format generated by the detecting program to the system management subsystem 100.

First, processing of the management information passively i.e. 170 detected will be explained. When the operational subsystem 200 executes the application program 290, the management information such as start/completion of the operation, occurrence of a fault and the kind of faults, and restoration of a fault is notified to the OS 250. When the management information is generated, the detecting program 271 detects the generation of the management information, and concurrently loads the management information. The loaded management information is selected by the format converting program 272 and thereafter converted into the standardized management information format. The management information transmitting program 273 transmits the format-converted management information to the system management subsystem 100, using the network communication functions of the operational subsystem 200. The transmitted management information data is loaded into the system management subsystem 100 through the receiving program 171. The state display data generating program 172 verifies the system state at this point to update the system state, and generates a new system-state display data. The state displaying program 173 displays the new system-state display data on the display unit (e.g, a character display or a graphic display) to provide the total system management information to the management/maintenance person.

Next, processing of the management information actively detected will be explained. The verification request detecting program 181 detects the generation of the verification request and loads the verification contents data. The generation of the verification request may be a case of a routine verification request using the counting function in the system management subsystem 100, or a case of a verification request by the management/maintenance person. The verification instruction data generating program 182 processes the loaded verification contents data and generates verification instruction data which is notified to the operational subsystem 200. The verification instruction data are transmitted to the operational subsystem 200 by the verification instruction transmitting program 183. The transmitted verification instruction data are loaded into the operational subsystem 200 through the receiving program 281. The verification program 282 decodes and analyzes the verification instruction data and executes the simulative operation in accordance with the instructed verification contents, using the resources which the application programs use, and collects the management information generated as a result of executing the simulative operation. The collected management information is selected by the verification program 282 and thereafter converted into a standardized management information format. The management information transmitting program 283 transmits the format-converted management information to the system management subsystem 100, using the network communication functions of the operational subsystem 200. The transmitted management information data is loaded into the system management subsystem 100 through the receiving program 171. The state display data generating program 172 verifies the system state at this point to update the system state based on the loaded management information data, and generates the new system-state display data. The state displaying program displays the new system-state display data on the display unit (e.g., a character display or a graphic display) to provide the total system management information to the management/maintenance person. For example, if this active method is used in addition to the former passive method, the state of the disabled operation such as a power outage or a hang up in the operational subsystems can be detected and displayed.

The data format conversion from the management information format peculiar to the operational subsystem 200 to the standardized management information format which is common to the whole system, executed in the aforesaid format converting program 272 or in the verification program 282 is executed in the following manner. FIG. 17 and FIG. 18 are a view for explaining the data format conversion. FIG. 17 is one example of data in a management information format peculiar to the operational subsystem 200 before the conversion, and FIG. 18 is one example of data in a standardized management information format after the conversion.

The management information format of FIG. 17 comprises a state code frame showing the operating state, a name-of-system resources frame in which a name of resources relating to the generation of the management information is written, and a comment frame.

The standardized management information format of FIG. 18 comprises a header frame including a kind of monitoring region, a kind-of-operational subsystems frame, a name-of-system resources frame relating to the management information, and a state-of-resources frame, a date-of-management information generated frame, and a comment frame relating to the state of the resources. Here, a kind of monitoring regions means a kind of the ways of practical use such as the communication network monitoring, the system monitoring, or the application monitoring. For example, in a case of the application monitoring, "application" is written.

The format converting program 272 or the verification program 282 receives the management information having a format peculiar to the operational system 200 as shown in FIG. 17, and then decides which monitoring regions the management information relates to, based on the format, and thereafter writes information indicating a kind of the monitoring regions into the kind-of-monitoring regions frame in the standardized management information format. Next, an identifier indicating the operational subsystem 200 is written into the name-of-operational subsystem frame. This identifier is uniquely defined in the system for each operational subsystems. Then, a name of system resources is written into the name-of-system resources frame. Here, a name of system resources means components of the system. For example, if it is an order receiving program, "JUTYU" is written in. Next, the state code frame and the comment frame for the management information are analyzed, thereby the state indicated by the management information can be analyzed. Therefore, the results are written into the monitoring state frame. Further, the date of the management information generated which is detected by the counting function of the operational subsystem 200 is written into the date frame. Finally, if there is the special comment in the comment frame for the management information before the conversion, the same comment is written into the comment frame in the standardized management information format.

The present invention is not limited to the above embodiments but can be varied in many ways. For example, in the embodiment, the format converting means for the management information is mounted in the operational subsystem but it may be mounted in the system management subsystem. Note that when the system management subsystem is expanded, amounts of modification will be larger compared to the method of the embodiment. Further, the standardized management information format can freely be set unless the format is common to the whole system.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A computer network comprising:
   a system management subsystem including a host computer programmed to monitor network resources; and
   one or more operational subsystems, each including:
      a host computer and a plurality of network resources managed by the host computer, and
      notifying means for communicating management information describing said plurality of network resources managed by said host computer of said operational computer subsystem, wherein said management information is gathered in a non-standard format peculiar to the operational subsystem and is communicated to the host computer in the system management subsystem while said operational subsystem is in communication with said system management subsystem over said network; and
      wherein said system management subsystem includes state display means for displaying at least some of the management information in a standardized format that differs from the non-standard format and that is understood by other computer systems.

2. A computer system according to claim 1 wherein said notifying means comprises:
   management information detecting means for detecting generation of the management information,
   format converting means for converting said management information from the non-standard format into the standardized format, and
   management information transmitting means for transmitting the management information converted into said standardized format by said information format converting means to said system management subsystem; and
   wherein said state display means further comprises:
      receiving means for receiving the management information having said standardized format transmitted by said operational subsystem,
      data generating means for generating system-state display data based on the management information having said standardized format, relating to all of the operational subsystems, loaded through said receiving means, and
      display means for displaying said state display data.

3. A computer system according to claim 2 wherein said format converting means comprises
   a reference table for the format conversion registered by every said operational subsystem, and
   a program stored in said operational subsystem, for executing the data format conversion, referring to said reference table for the format conversion.

4. A computer system according to claim 2 wherein said receiving means comprises one receiving unit; and the management information having said standardized management information format transmitted from said operational subsystem is through said receiving unit.

5. A computer network comprising:
   a system management subsystem, including a host computer programmed to monitor network resources; and
   one or more operational subsystems, each including:
      a host computer and a plurality of network resources managed by said host computer;
      notifying means for communicating management information describing said plurality of network resources managed by said host computer of said operational subsystem, wherein said management information is gathered in a non-standard format peculiar to the operational subsystem and is communicated to the host computer in the system management subsystem while said operational subsystem is in communication with said system management subsystem over said network;
      verifying means, coupled to the system management subsystem and to the operational subsystem, for actively verifying resources managed by said host computer of said operational subsystem, in response to an instruction of said system management subsystem, and for communicating verification results to said system management subsystem;
   wherein said system management subsystem includes:
      state display means for displaying at least some of the management information in a standardized format that differs from the non-standard format and that is understood by other computer systems; and
      instructing means for instructing said verifying means to verify.

6. A computer system according to claim 5 wherein said notifying means comprises:
   management information detecting means for detecting the generation of the management information,
   format converting means for converting the management information from the non-standard format into the standardized format, and
   management information transmitting means for transmitting the subsystem management information converted into said standardized management information format by said format converting means to said system management subsystem; and
   wherein said state display means comprises:
      receiving means for receiving the management information format, transmitted from said operational subsystem,
      data generating means for generating total system-state display data based on the management information having said standardized management information format, relating to said all operational subsystems, loaded through said receiving means, and
      display means for displaying said state display data.

7. A computer system according to claim 6 wherein said format converting means comprises
   a reference table for the format conversion registered by every said operational subsystem, and
   a program stored in said operational subsystems, for executing the data format conversion, referring to said reference table for the format conversion.

8. A computer system according to claim 6 wherein said receiving means comprises one receiving unit; and the management information having said standardized management information format transmitted from said operational is through said receiving unit.

9. A computer system according to claim 5 wherein said instructing means comprises generating means for periodically generating a verification instruction request in said system management subsystem, verification instruction data generating means for generating verification instruction data to be notified to said operational subsystem in accordance with verification contents instructed by said generating means, and verification instruction transmitting means for transmitting said verification instruction data to said operational subsystem.

10. A computer system according to claim 5 wherein said instructing means comprises verification instruction detecting means for detecting a verification instruction from outside, verification instruction data generating means for generating verification instruction data to be notified to said operational subsystem in accordance with requested verification contents detected by said verification instruction detecting means, and verification instruction transmitting means for transmitting said verification instruction data to specified said operational subsystem.

11. A computer system according to claim 10 said verification instruction from the outside is an input of said system management subsystem from a person.

12. A computer system according to claim 5 wherein said verifying means comprises verification instruction receiving means for receiving the verification instruction data transmitted by said system management subsystem, verification executing means for analyzing the verification instruction data, executing a simulative operation for specified verification, whereby operation results are obtained, and verification results transmitting means for transmitting the verification results obtained by said verification executing means to said system management subsystem.

* * * * *